(12) United States Patent
Xi et al.

(10) Patent No.: US 10,551,956 B2
(45) Date of Patent: Feb. 4, 2020

(54) ARRAY SUBSTRATE, DISPLAY PANEL, DISPLAY DEVICE, AND FABRICATION METHOD THEREOF

(71) Applicants: Shanghai AVIC OPTO Electronics Co., Ltd., Shanghai (CN); Tianma Micro-electronics Co., Ltd., Shenzhen (CN)

(72) Inventors: Kerui Xi, Shanghai (CN); Tingting Cui, Shanghai (CN)

(73) Assignees: Shanghai AVIC OPTO Electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 264 days.

(21) Appl. No.: 15/163,397

(22) Filed: May 24, 2016

(65) Prior Publication Data
US 2017/0168636 A1    Jun. 15, 2017

(30) Foreign Application Priority Data
Dec. 11, 2015 (CN) .......................... 2015 1 0926109

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ......... G06F 3/0416; G06F 2203/04103; G06F 3/0412; G06F 3/00–167;
(Continued)

(56) References Cited

U.S. PATENT DOCUMENTS

| 2004/0135951 A1* | 7/2004 | Stumbo .................. B82Y 10/00 349/139 |
| 2010/0231493 A1* | 9/2010 | Kaise ................ G02F 1/136213 345/87 |

(Continued)

FOREIGN PATENT DOCUMENTS

| CN | 102693034 A | 9/2012 |
| CN | 104699347 A | 6/2015 |

(Continued)

*Primary Examiner* — Amr A Awad
*Assistant Examiner* — Aaron Midkiff
(74) *Attorney, Agent, or Firm* — Anova Law Group PLLC

(57) ABSTRACT

An array substrate includes a plurality of pixel units defined by intersected gate electrode lines and data lines, a plurality of independent touch-control electrodes arranged in an array, and a touch-control circuit. The touch-control circuit includes a plurality of first switch units, a plurality of first control leads, a plurality of touch-detection terminals, and a control unit. The touch-control electrode is electrically connected to one touch-control terminal through at least one of the first switch units. The first switch unit is electrically connected to the control unit through at least one of the first control leads. The first control lead is configured between any of neighboring rows of the pixel units. Further, when the array substrate is in a touch detection phase, the control unit is capable of controlling an ON status of the first switch units to allow row-by-row control of touch detection for the plurality of touch-control electrodes.

20 Claims, 10 Drawing Sheets

(58) Field of Classification Search
CPC .... G06F 2203/00–04809; G06F 3/041–04897; G06F 2203/041–04809; G02F 1/13338; G02F 1/136286; G02F 2201/40; H01L 27/124; H01L 27/3276; G09G 2300/0426; G09G 2300/0465
USPC ............. 178/18.01–20.04; 345/173–178
See application file for complete search history.

(56) References Cited

U.S. PATENT DOCUMENTS

| | | | | |
|---|---|---|---|---|
| 2011/0050585 A1* | 3/2011 | Hotelling | ............ | G06F 3/0412 345/173 |
| 2012/0218199 A1* | 8/2012 | Kim | ............ | G06F 3/0412 345/173 |
| 2012/0249444 A1* | 10/2012 | Lee | ............ | G06F 3/0412 345/173 |
| 2014/0152619 A1* | 6/2014 | Hotelling | ............ | G09G 3/3648 345/174 |
| 2014/0168127 A1* | 6/2014 | Yang | ............ | G06F 3/0412 345/173 |
| 2014/0168157 A1* | 6/2014 | Yang | ............ | G06F 3/044 345/174 |
| 2015/0097808 A1* | 4/2015 | Roh | ............ | G06F 3/0412 345/174 |
| 2016/0188040 A1* | 6/2016 | Shin | ............ | G06F 3/047 345/174 |

FOREIGN PATENT DOCUMENTS

| | | |
|---|---|---|
| CN | 104765498 A | 7/2015 |
| CN | 105301822 A | 2/2016 |

* cited by examiner

ARRAY SUBSTRATE, DISPLAY PANEL, DISPLAY DEVICE, AND FABRICATION METHOD THEREOF

CROSS-REFERENCES TO RELATED APPLICATIONS

This application claims the priority of Chinese patent application No. 201510926109.2, filed on Dec. 11, 2015, the entirety of which is incorporated herein by reference.

BACKGROUND

Touch-control display device is a device that allows user to enter user command by selecting displayed content either directly using hand or with assistance of other objects. When user uses hand or other objects to touch the screen of a touch-control display device, the touch-control display device detects the touch point and then converts the touch point to a corresponding command. Then, based on the entered command, the touch-control display device may be driven to realize a specific display.

According to the operation principles, the existing touch-control display devices may fall into two categories: capacitive touch-control display device and inductive touch-control display device, respectively. The capacitive touch-control display device further includes self-capacitive touch-control display device. However, the wiring of touch-control structures in existing self-capacitive touch-control display devices may be quite complicated and the area occupied by the wiring may also be relatively large. Therefore, the existing self-capacitive touch-control display devices may not be conducive to the development of thinner and lighter display devices.

The disclosed array substrate, display panel, display device, and the fabrication methods are directed to solve one or more problems set forth above and other problems in the art.

BRIEF SUMMARY OF THE DISCLOSURE

One aspect of the present disclosure includes an array substrate. The array substrate includes a plurality of pixel units defined by intersected gate electrode lines and data lines, a plurality of independent touch-control electrodes arranged in an array, and a touch-control circuit. The touch-control circuit includes a plurality of first switch units, a plurality of first control leads, a plurality of touch-detection terminals, and a control unit. The touch-control electrode is electrically connected to one touch-control terminal through at least one of the first switch units. The first switch unit is electrically connected to the control unit through at least one of the first control leads. The first control lead is configured between any of neighboring rows of the pixel units. Further, when the array substrate is in a touch detection phase, the control unit is capable of controlling an ON status of the first switch units to allow row-by-row control of touch detection for the plurality of touch-control electrodes.

Another aspect of the present disclosure provides a method for forming an array substrate. The method includes providing a plurality of pixel units. The plurality of pixel unites is defined by intersected gate electrode lines and data lines. The method also includes forming a plurality of independent touch-control electrodes in an array and forming a touch-control circuit including a plurality of first switch units, a plurality of first control leads, a plurality of touch-detection terminals, and a control unit. The touch-control electrode is electrically connected to one touch-control terminal through at least one of the first switch units. The first switch unit is electrically connected to the control unit through at least one of the first control leads. The first control lead is configured between any of neighboring rows of the pixel units. Further, when the array substrate is in a touch detection phase, the control unit controls an ON status of the first switch units to allow row-by-row control of touch detection for the plurality of touch-control electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
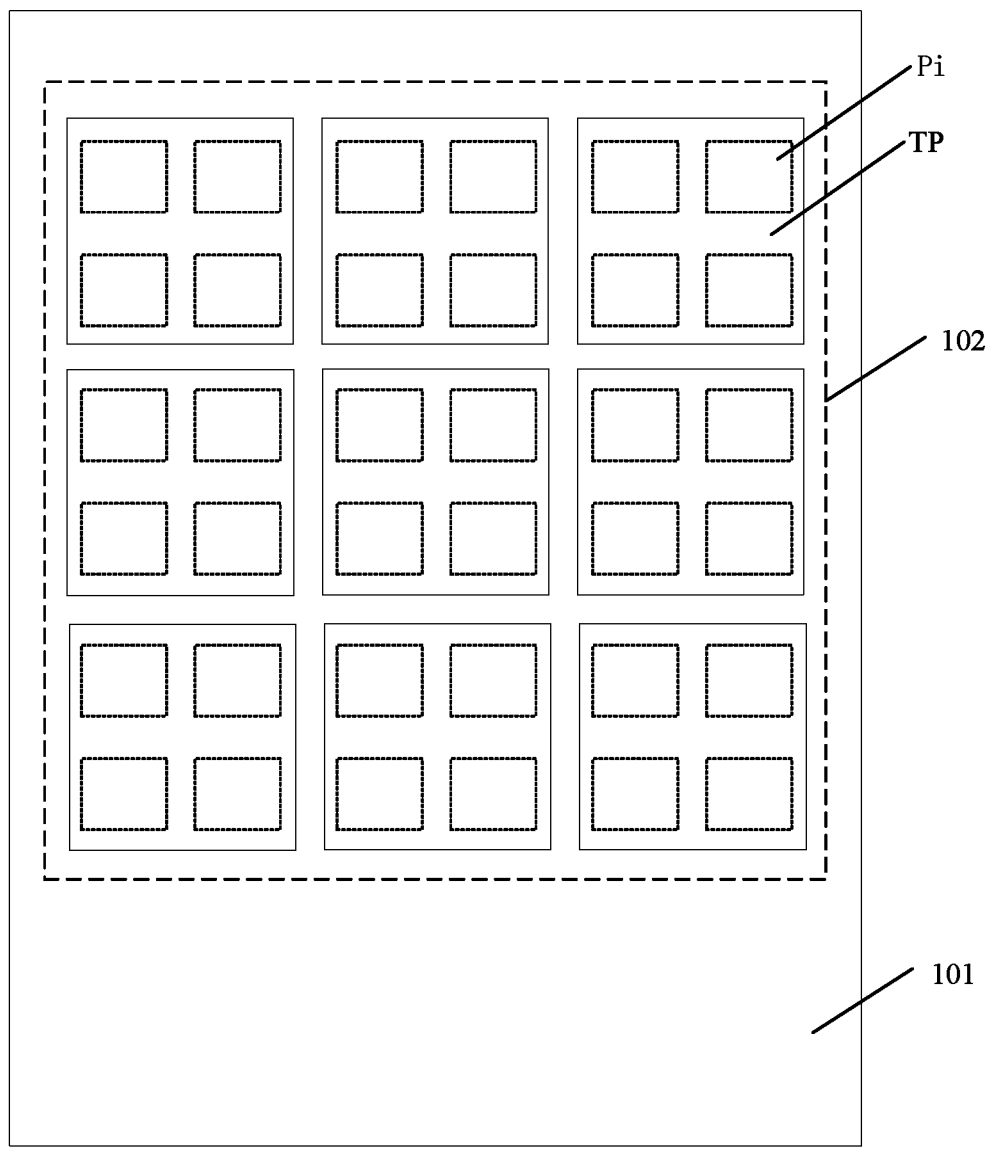
FIG. 1A illustrates a schematic view of an exemplary array substrate consistent with disclosed embodiments.

The present disclosure provides an array substrate. FIG. 1A shows a schematic view of an exemplary array substrate consistent with disclosed embodiments.

Referring FIG. 1A, an array substrate includes a non-display region 101 and a display region 102. The display region 102 includes a plurality of pixel unites Pi and a plurality of touch-control electrodes TP. The plurality of pixels Pi is arranged in an array defined by a plurality of gate electrode lines and a plurality of data lines with the plurality of gate electrode lines intercepting with the plurality of data lines. Further, each pixel unit Pi includes a sub-pixel. The plurality of touch-control electrodes TP is also arranged into an array. The touch-control electrodes TP and the pixel units Pi may be arranged in a manner based on actual requirement of application. Specifically, each touch-control electrode TP may correspond to at least one sub-pixel. Further, the touch-control electrodes TP are electrically isolated from each other.

For illustration purposes, FIG. 1A shows an array of touch-control electrodes TP with three rows and three columns. In other embodiments, the array substrate may include n*m touch-control electrodes, where n and m represent the number of the columns and the number of the rows, respectively. Both n and m are positive integers. The number of pixel units is not specified in the present disclosure and the number may be determined based on actual requirement of application.

Optionally, the array substrate may also include a plurality of common electrodes. The plurality of common electrodes may include the plurality of touch-control electrodes TP. That is, the touch-control electrodes and the common electrodes of the array substrate may be arranged in a same layer, e.g., the common electrodes may be multiplex electrodes, which are also used for touch-control. The common electrodes may be formed by patterning a common electrode layer. In other embodiments, based on actual requirement of application, the touch-control electrodes and the common electrodes may be arranged separately in different layers.

Figure 1B:
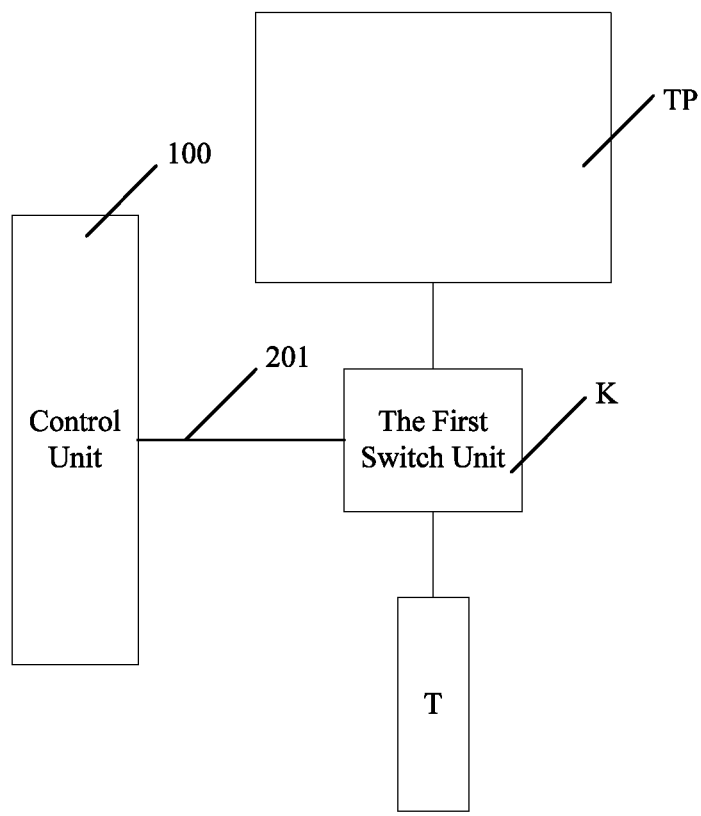
FIG. 1B illustrates a schematic touch-control circuit diagram for an exemplary single touch-control electrode consistent with disclosed embodiments.

FIG. 1B shows a schematic touch-control circuit diagram for a single touch-control electrode consistent with disclosed embodiments. Referring to FIG. 1B, a touch-control electrode TP is electrically connected to one terminal of at least one first switch unit K. The other terminal of the first switch unit K is electrically connected to a touch-detection terminal T. In addition, the control terminal of the first switch unit K is electrically connected to a corresponding terminal of a control unit 100 through at least one first control lead 201.

During a touch detection phase of the array substrate, when the scanning process reaches the specific touch-control electrode TP, the control unit 100 may control the first switch unit K to be in an ON status. Therefore, the touch-detection terminal T and the touch-control electrode TP are connected, allowing detection on the touch-control electrode TP. Specifically, whether the capacitor of the touch-control electrode TP is changed may indicate whether a touch is made on the screen at a position corresponding to the touch-control electrode TP. After scanning the touch-control electrode TP, the control unit 100 may control the first switch unit K to switch to an OFF status. Therefore, the connection between the touch-detection terminal T and the touch-control electrode TP is disconnected.

Further, during the display phase of the array substrate, reference signals may need to be sent to the touch-control electrodes TP. Therefore, the touch-control circuit may further include: a plurality of second switch units, a plurality of second control leads, and a plurality of reference signal terminals. Each touch-control electrode may be electrically connected to a corresponding reference signal terminal through a second switch unit while the second switch unit may be electrically connected to the control unit through a second control lead. Moreover, the second control leads may be individually arranged between two different neighboring rows of the pixel units.

During the touch detection phase of the array substrate, the control unit may control the first switches to be in the ON status and the second switches to be in an OFF status to realize line-by-line control, such as a row-by-row control, of touch detection for multiple touch-control electrodes.

Further, during the display phase of the array substrate, the control unit may control the first switches to be in the OFF status and the second switches to be in the ON status.

Figure 2A:
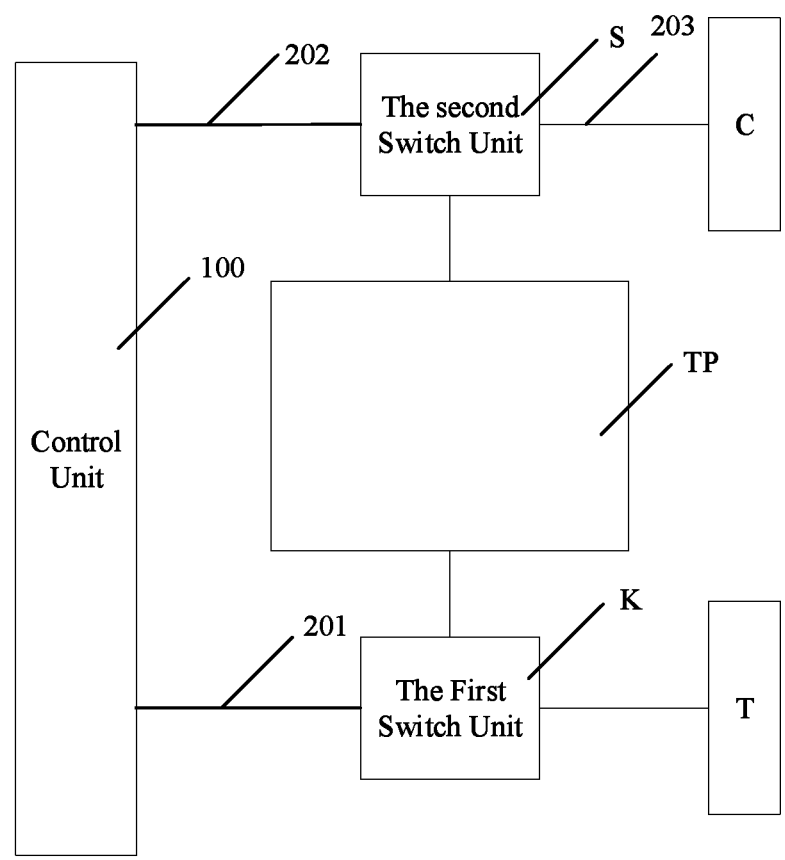
FIG. 2A illustrates a schematic touch-control circuit diagram for another exemplary single touch-control electrode consistent with disclosed embodiments.

For example, FIG. 2A shows a schematic touch-control circuit diagram of another exemplary single touch-control electrode consistent with disclosed embodiments. Referring to FIG. 2A, a touch-control electrode TP is connected to one terminal of at least one first switch unit K. The other terminal of the first switch unit K is electrically connected to a touch-detection terminal T. In addition, the control terminal of the first switch unit K is electrically connected to a corresponding terminal of a control unit 100 through at least one first control lead 201. Further, the touch-control electrode TP is also electrically connected to one terminal of at least one second switch unit S. The other terminal of the second switch unit S is electrically connected to a reference signal terminal C. In addition, the control terminal of the second switch unit S is electrically connected to a corresponding terminal of a control unit 100 through at least one second control lead 202.

Referring to FIG. 2A, during a touch detection phase of the array substrate, when the scanning process reaches the specific touch-control electrode TP, the control unit 100 controls the first switch unit K to be in an ON status and the second switch unit S to be in an OFF status. Therefore, the touch-detection terminal T and the touch-control electrode TP are connected, allowing detection on the touch-control electrode TP. During a display phase of the array substrate, the control unit 100 controls the first switch unit K to be in an OFF status and the second switch unit S to be in an ON status. Therefore, the connection between the touch-detection terminal T and the touch-control electrode TP is disconnected, and the reference signal sent out from the reference signal terminal C is transmitted to the touch-control electrode TP through the second switch unit S.

In one embodiment, both the first switch unit and the second switch unit may include a switch transistor. Specifically, the first switch unit K includes at least one first-type switch transistor, the second switch unit S includes at least one second-type switch transistor, and the conductivity type of the first-type switch transistor and the conductivity type of the second-type switch transistor are the same. In certain other embodiments, the first switch unit K may include at least one first-type switch transistor, the second switch unit S may include at least one second-type switch transistor, and the conductivity type of the first-type switch transistor and the conductivity type of the second-type switch transistor are opposite to each other.

Figure 2B:
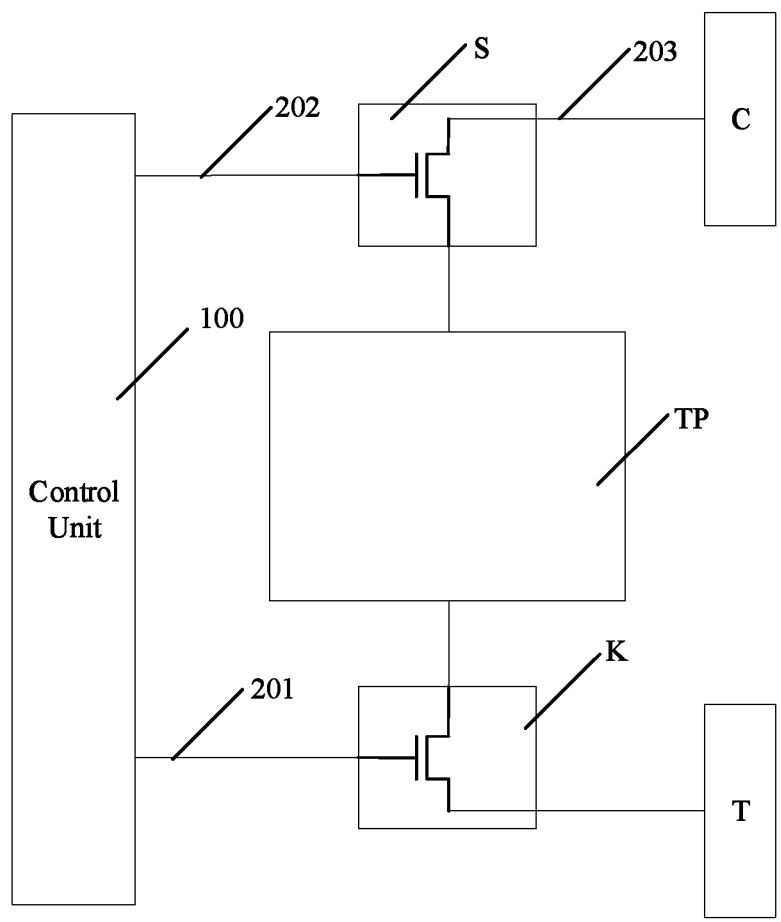
FIG. 2B illustrates a schematic touch-control circuit diagram for another exemplary single touch-control electrode consistent with disclosed embodiments.

FIG. 2B shows a schematic touch-control circuit diagram of another exemplary single touch-control electrode consistent with disclosed embodiments. Referring to FIG. 2B, a first switch unit K includes a first-type switch transistor. One terminal of the first-type switch transistor is electrically connected to the touch-control electrode TP while the other terminal of the first-type switch transistor is electrically connected to a corresponding touch-detection terminal T. In addition, the control terminal of the first-type switch transistor is electrically connected to a corresponding terminal of the control unit 100 through a first control lead 201. Moreover, a second switch unit S includes a second-type switch transistor. One terminal of the second-type switch transistor is electrically connected to the touch-control electrode TP while the other terminal of the second-type switch transistor is electrically connected to a corresponding reference signal terminal C. In addition, the control terminal of the second-type switch transistor is electrically connected to a corresponding terminal of the control unit 100 through a second control lead 202.

The conductivity type of the first-type switch transistor shown in FIG. 2B and the conductivity type of the second-type switch transistor shown in FIG. 2B are the same. The first-type switch transistor and the second-type switch transistor may be both N-type switch transistors, or may be both P-type switch transistors. Therefore, during the wiring process, the first control lead and the second control lead may be respectively connected to the first switch unit and the second switch unit to realize the ON status and the OFF status for each of the two switch units in different phases.

In other embodiments, the type of the first-type switch transistor and the type of the second switch transistor may be opposite to each other to reduce the total number of the control leads. Therefore, the first switch unit and the second switch unit of a given touch-control electrode may be electrically connected to the control unit through a same control lead. That is, for a given touch-control electrode, the first control lead connected to the first switch unit and the second control lead connected to the second switch unit may be a same control lead.

Figure 2C:
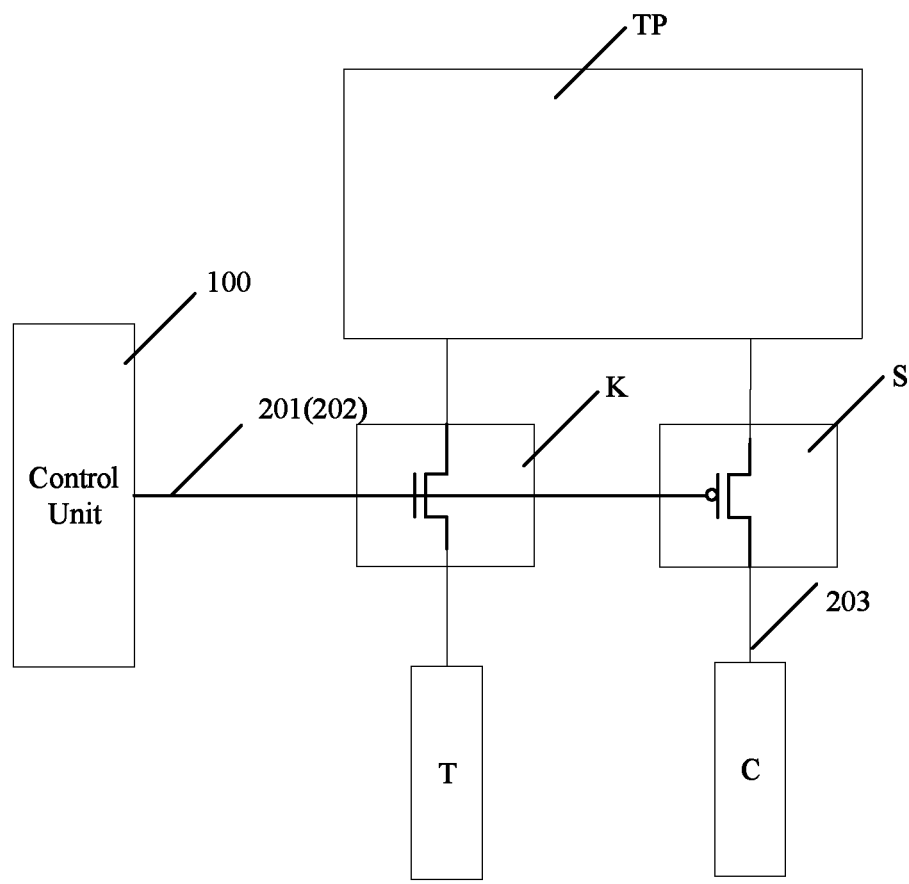
FIG. 2C illustrates a schematic touch-control circuit diagram for another exemplary single touch-control electrode consistent with disclosed embodiments.

FIG. 2C shows a schematic touch-control circuit diagram of another exemplary single touch-control electrode consistent with disclosed embodiments. Referring to FIG. 2C, the first-type switch transistor is an N-type switch transistor and the second-type switch transistor is a P-type switch transistor. In other embodiments, the two types of switch transistors may be interchangeable. The control terminals of the two types of switch transistors may be connected together by a control lead 201 (202), which is also electrically connected to a corresponding terminal of the control unit 100.

During a touch detection phase of the array substrate, when the scanning process reaches the touch-control electrode TP, the corresponding terminal of the control unit 100 may send out a high-level signal to control the first-type switch transistor to be in the ON status while having the second-type switch transistor in the OFF status to allow detection on the touch-control electrode TP. During a display phase of the array substrate, the corresponding terminal of the control unit 100 may send out a low-level signal to control the first-type switch transistor to be in the OFF status while having the second-type switch transistor in the ON status to transmit the reference signal to the touch-control electrode TP.

Figure 2D:
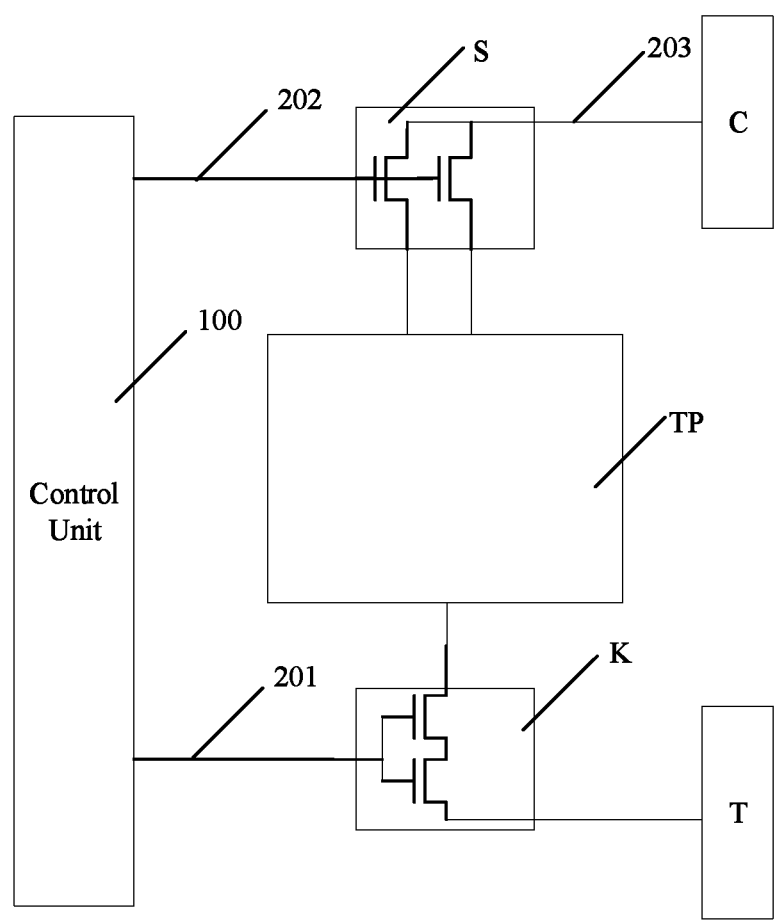
FIG. 2D illustrates a schematic touch-control circuit diagram for another exemplary single touch-control electrode consistent with disclosed embodiments.

FIG. 2D shows a schematic touch-control circuit diagram of another exemplary single touch-control electrode consistent with disclosed embodiments. Compared to the embodiments shown in FIGS. 2A-2C, where each switch unit only includes one switch transistor, the touch-control circuit diagram shown in FIG. 2D provides an example in which both the first switch unit and the second switch unit may include multiple switch transistors.

Specifically, referring to FIG. 2D, a first switch unit K includes a plurality of first-type switch transistors. The plurality of first-type switch transistors may be connected in a series with the two terminals of the series electrically connected to the touch-control electrode TP and the touch-detection terminal T, respectively. The second switch unit S may include a plurality of second-type switch transistors. The plurality of second-type switch transistors may be connected in parallel with each other with each second-type switch transistor electrically connected to both the touch-control electrode TP and the touch-detection terminal T.

In above disclosed embodiments, the reference signal terminal may include a common signal terminal of the array substrate. In addition, first switch units corresponding to touch-control electrodes arranged in a same column may be electrically connected to a same touch-detection terminal in order to reduce the number of the touch-detection terminals and also reduce the difficulty in arranging the leads. The touch-detection terminal may include a data-signal input terminal, i.e., the data-signal input terminal may be a multiplex electrode used also as a touch-detection terminal.

Moreover, in one embodiment, the second switch unit may be electrically connected to a reference signal terminal through a reference lead 203 to further ensure the aperture ratio of the pixel units. The reference lead 203 may be arranged between any pair of neighboring rows of the pixel units. There reference lead 203, the first control lead 201, and the second control lead 202 may be arranged between different neighboring rows of the pixel units in order to avoid overlay dense wiring between two neighboring rows of the pixel units.

A reference signal terminal is also a common signal terminal, because the common signal is more important for the display of the display device, the ON-state impedance of the second switch unit for transmitting the common signal may need to be small. Usually, the ON-state impedance of the second switch unit may need to be below 50 kΩ. Further, the OFF-state impedance of the first switch unit may need to be relatively large in order to prevent signal crosstalk. Usually, the OFF-state impedance of the first switch unit may need to be above 5000 kΩ.

The type of the switch transistors in the first switch unit and the second switch unit, the connection strategies, and the width to length ratio may not be limited to any specific selections. The type of the switch transistors in the first switch unit and the second switch unit, the connection strategies, and the width to length ratio may be defined based on actual requirements.

Figure 3A:
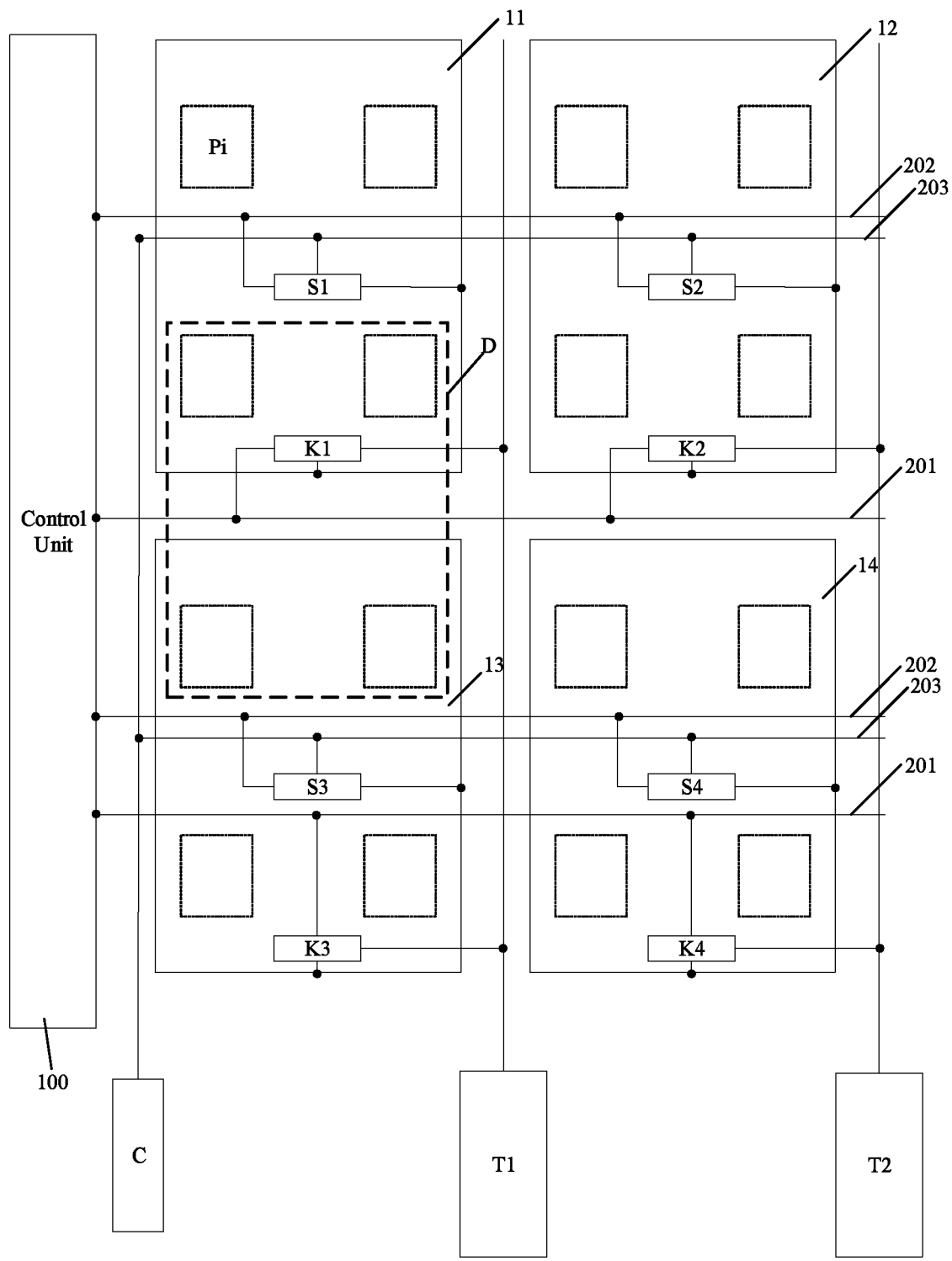
FIG. 3A illustrates a schematic view of another exemplary array substrate consistent with disclosed embodiments.
Figure 3B:
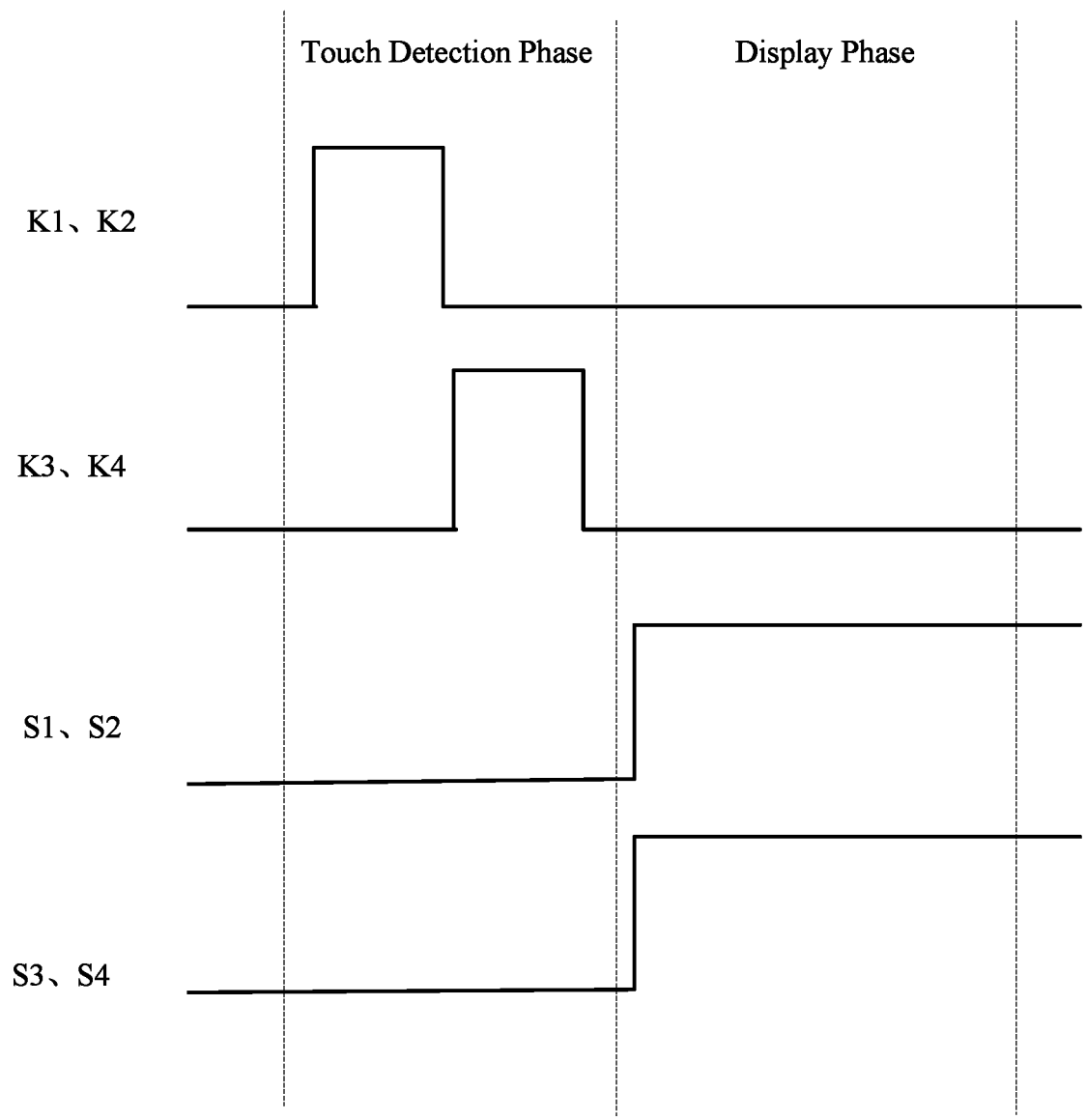
FIG. 3B illustrates a schematic processing diagram for the array substrate shown in FIG. 3A.

FIG. 3A shows a schematic view of an exemplary array substrate consistent with disclosed embodiments. FIG. 3B shows a schematic processing diagram for the array substrate shown in FIG. 3A. Referring to FIG. 3A, the present disclosure is described to have the array substrate include four touch-control electrodes to illustrate the relation of the plurality of touch-control electrodes and the operation mechanism of the disclosed method, although any number of touch-control electrodes, more or less than four, may be included in the array substrate. In addition, the first switch units and the second switch units may all have an ON status corresponding to a high-level signal and an OFF status corresponding to a low-level signal.

Referring to FIG. 3A, the array substrate includes four touch-control electrodes, i.e. a first touch-control electrode 11, a second touch-control electrode 12, a third touch-control electrode 13, and a fourth touch-control electrode 14. The first touch-control electrode 11 is electrically connected to a terminal of the first switch unit K1, the second touch-control electrode 12 is electrically connected to a terminal of the first switch unit K2, the third touch-control electrode 13 is electrically connected to a terminal of the first switch unit K3, and the fourth touch-control electrode 14 is electrically connected to a terminal of the first switch unit K4. The other terminal of the first switch unit K1 and the other terminal of the first switch unit K3 are electrically connected to a same touch-detection terminal T1 while the control terminals of the first switch units K1 and K2 are electrically connected to a same terminal of the control unit 100 through a first control lead 201. The other terminal of the first switch unit K2 and the other terminal of the first switch unit K4 are electrically connected to a same touch-detection terminal T2 while the control terminals of the first switch units K1 and K2 are electrically connected to a same terminal of the control unit 100 through a first control lead 201. The first control lead 201 may be arranged between two neighboring rows of the pixel units.

Further, the first touch-control electrode 11 is electrically connected to a terminal of the second switch unit S1, the second touch-control electrode 12 is electrically connected to a terminal of the second switch unit S2, the third touch-control electrode 13 is electrically connected to a terminal of the third switch unit S3, and the fourth touch-control electrode 14 is electrically connected to a terminal of the second switch unit S4. The other terminals of the first touch-control electrode 11, the second touch-control electrode 12, the third touch-control electrode 13, and the fourth touch-control electrode 1 are electrically connected to a reference signal terminal C. The control terminals of the first switch units S1 and S2 are electrically connected to a corresponding control unit 100 through a second control lead 202. The control terminals of the second switch units S3 and S4 are also electrically connected to a corresponding control unit 100 through a second control lead 202. The second control lead 202 may be arranged between two neighboring rows of the pixel units.

Referring to FIG. 3B, during a touch detection phase of the array substrate, the control unit 100 may first send out high-level signals to the first switch units K1 and K2 and low-level signals to the first switch units K3 and K4 as well as the second switch units S1, S2, S3, and S4. That is, the control unit 100 may control the first switch units K1 and K2 in the ON status while controlling the first switch units K3 and K4 as well as the second switch units S1, S2, S3, and S4 in the OFF status. Therefore, the touch-detection terminal T1 and the first touch-control electrode 11 are electrically connected to allow the detection on the first touch-control electrode 11, and in the meantime, the touch-detection terminal T2 and the second touch-control electrode 12 are also electrically connected to allow the detection on the second touch-control electrode 12.

The control unit 100 may then send out high-level signals to the first switch units K3 and K4 and low-level signals to the first switch units K1 and K2 as well as the second switch units S1, S2, S3, and S4. That is, the control unit 100 may control the first switch units K3 and K4 to be in the ON status while controlling the first switch units K1 and K2 as well as the second switch units S1, S2, S3, and S4 to be in the OFF status. Therefore, the touch-detection terminal T3 and the third touch-control electrode 13 are electrically connected to allow the detection on the third touch-control electrode 13, and in the meantime, the touch-detection terminal T4 and the fourth touch-control electrode 14 are also electrically connected to allow the detection on the fourth touch-control electrode 14.

Therefore, as described above, the control unit may sequentially control all the first switch units to be in the ON status while having all the second switch units in the OFF status to realize line-by-line control of touch detection for multiple touch-control electrodes.

Moreover, during a display phase of the array substrate, the control unit 100 may send out low-level signals to all the first switch units K1, K2, K3, and K4, and in the meantime, send out high-level signals to all the second switch units S1, S2, S3, and S4. That is, the control unit 100 may have all the first switch units K1, K2, K3, and K4 in the OFF status while having all the second switch units S1, S2, S3, and S4 in the ON status to transmit reference signals at the reference signal terminals to the first touch-control electrode 11, the second touch-control electrode 12, the third touch-control electrode 13, and the fourth touch-control electrode 14.

Figure 3C:
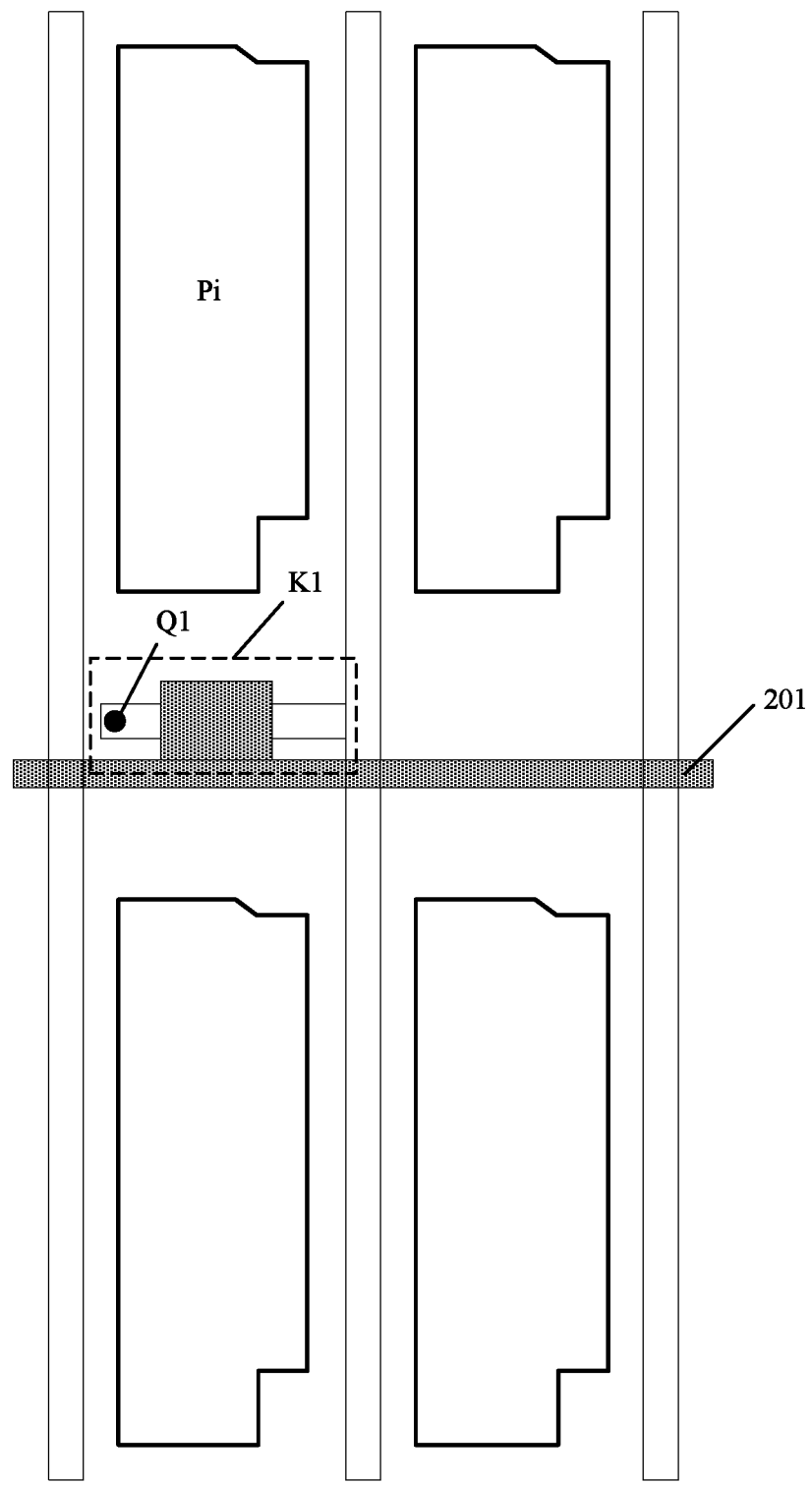
FIG. 3C illustrates a schematic view of the detailed structure of region D shown in FIG. 3A.

FIG. 3C shows a schematic view of the detailed structure of region D shown in FIG. 3A. Referring to FIG. 3C, for illustration purpose, a first control lead is described herein as an example. Specifically, the first control lead 201 may be formed between two neighboring rows of pixel units. The first switch unit K1 is a switch transistor. The gate electrode of the switch transistor may be electrically connected to the first control lead 201. One terminal of the switch transistor may be electrically connected to the corresponding touch-detection terminal T1 while the other terminal of the switch transistor may be electrically connected to the first touch-control electrode 11. In one embodiment, arranging the first control lead between neighboring rows of pixel units may avoid affecting the aperture ratio of the pixel units, thus ensure high display quality of the display device.

Moreover, in one embodiment, the first control lead 201 may or may not be arranged in a same conductive layer as the gate electrode.

Figure 4:
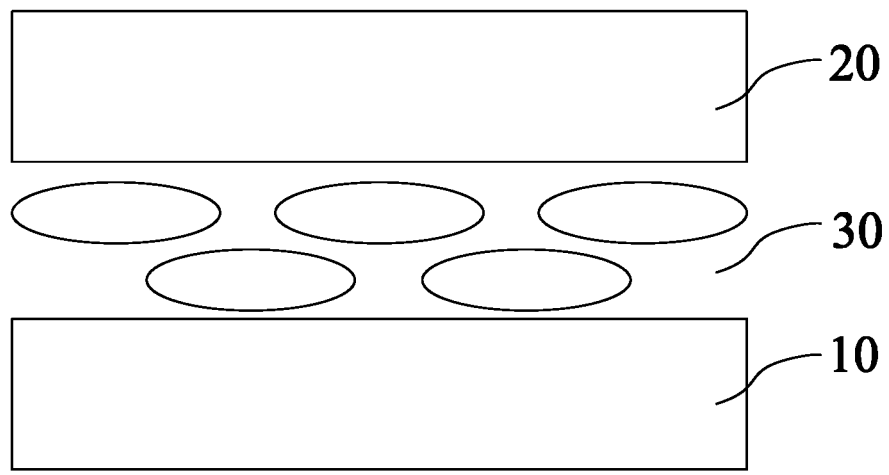
FIG. 4 illustrates a schematic view of an exemplary display panel consistent with disclosed embodiments.

Further, the present disclosure also provides a display panel. FIG. 4 shows a schematic view of an exemplary display panel consistent with disclosed embodiments.

Referring to FIG. 4, the display panel includes an array substrate 10 consistent with above disclosed embodiments, and a first substrate 20 disposed corresponding to the array substrate. In one embodiment, the first substrate may be a color film substrate. Coordinately, the display panel may also include a liquid crystal layer 30 between the first substrate 20 and the array substrate 10. In other embodiments, the type of the first substrate may be any appropriate substrate for forming a display panel.

Figure 5:
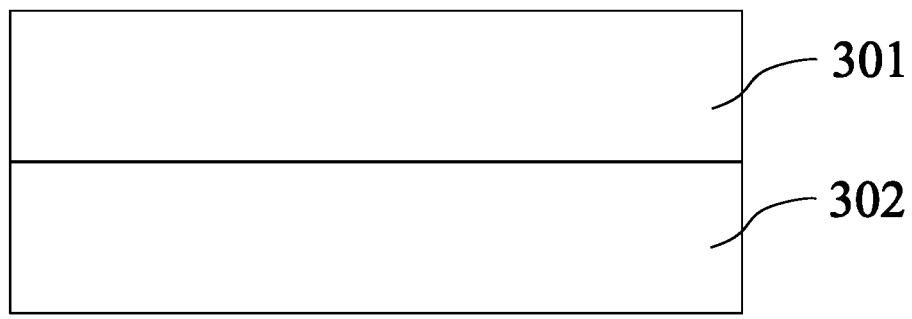
FIG. 5 illustrates a schematic view of an exemplary display device consistent with disclosed embodiments.

Further, the present disclosure also provides a display device. FIG. 5 shows a schematic view of an exemplary display device consistent with disclosed embodiments.

Referring to FIG. 5, the display device includes a display panel consistent with above disclosed embodiments. In one embodiment, the display device may be a liquid crystal display device. Specifically, the display device may include a display panel 301 consistent with above disclosed embodiments. In addition, the display device may also include a backlight module 302 disposed corresponding to the display panel 301.

In other embodiments, the display device may also be an organic light-emitting diode (OLED) display device or other type of display device.

According to the present disclosure, an array substrate, a display panel, and a display device are provided. The array substrate includes a plurality of gate electrode lines and a plurality of data lines. The plurality of gate electrode lines intercept with the plurality of data lines to define an array for a plurality of pixel units. The array substrate may also include a touch-control circuit and a plurality of touch-control electrodes arranged in an array. The plurality of touch-control electrodes may be independent from each other. The touch-control circuit may also include a plurality of first switch units, a plurality of first control leads, a plurality of touch-detection terminals and a control unit. Each touch-control electrode may be electrically connected to a touch-detection terminal through at least one of the first switch units while each first switch unit may be electrically connected to the control unit through at least one of the first control leads. The first control leads may be arranged between any pair of neighboring rows of pixel units. When the array substrate is in a touch detection phase, the control unit may sequentially control the first switch units to be in an ON status to allow line-by-line control of touch detection for the plurality of touch-control electrodes. Moreover, the array substrate may be adopted in a display panel and the display panel may further by used in a display device.

Using the disclosed array substrate, the display panel, and the display device, the touch-control structure on the array substrate may be simple and clear, and the area occupied by the touch-control structure may also be relatively small. Therefore, the disclosed array substrate, display panel, and display device may conducive to the development of thinner and lighter display devices. In addition, by arranging the first control leads between neighboring rows of pixel units, the aperture ratio of the pixel units may not be affected, thus high display quality of the display device may be ensured.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. An array substrate, comprising:
   a plurality of pixel units, defined by intersected gate electrode lines and data lines;
   a plurality of touch-control electrodes, arranged in an array; and
   a touch-control circuit including a plurality of first switch units, a plurality of first control leads, a plurality of touch-detection terminals, a control unit, a plurality of second switch units, a plurality of second control leads, a reference signal terminal, and a plurality of reference leads, wherein:
   a touch-control electrode of the plurality of touch-control electrodes is electrically connected to a touch-detection terminal of the plurality of touch-detection terminals through at least one first switch unit of the plurality of first switch units;
   the at least one first switch unit is electrically connected to the control unit through at least one first control lead of the plurality of first control leads, and an OFF-state impedance of the at least one first switch unit is over 5000 kΩ;
   the touch-control electrode is electrically connected to the reference signal terminal through a second switch unit of the plurality of second switch units;
   the second switch unit is electrically connected to the control unit through at least one second control lead of the plurality of second control leads;
   the second switch unit is electrically connected to the reference signal terminal through at least one reference lead of the plurality of reference leads;
   the at least one first control lead is configured between two directly adjacent rows of the plurality of pixel units to preserve an aperture ratio of the plurality of pixel units and between two directly adjacent rows of the plurality of touch-control electrodes;
   the at least one second control lead and the at least one reference lead are respectively configured between two directly adjacent rows of the plurality of pixel units and are at least partially overlapped with the touch-control electrode;
   the at least one first control lead, the at least one second control lead and the at least one reference lead are arranged between different directly adjacent rows of the plurality of pixel units to avoid overly dense wiring between two directly adjacent rows of pixel units;
   a row of the plurality of touch-control electrodes overlaps with a same second control lead and a same reference lead;
   along a direction perpendicular to the array substrate, the touch-control electrode completely covers the second switch unit and the at least one first switch unit; and
   when the array substrate is in a touch detection phase, the control unit is capable of controlling an ON status of the plurality of first switch units to allow row-by-row control of touch detection for the plurality of touch-control electrodes.

2. The array substrate according to claim 1, wherein:
   when the array substrate is in the touch detection phase, the control unit is capable of simultaneously controlling the ON status of the plurality of first switch units and an OFF status of the plurality of second switch units to allow the row-by-row control of the touch detection for the plurality of touch-control electrodes; and
   when the array substrate is in a display phase, the control unit is capable of simultaneously controlling all of the plurality of first switch units in the OFF status and all of the plurality of second switch units in the ON status.

3. The array substrate according to claim 2, wherein:
   the at least one first switch unit includes at least one first-type switch transistor;
   the second switch unit includes at least one second-type switch transistor; and
   the at least one first-type switch transistor and the at least one second-type switch transistor have a same conductivity type.

4. The array substrate according to claim 2, wherein:
   the at least one first switch unit includes at least one first-type switch transistor;
   the second switch unit includes at least one second-type switch transistor; and
   the at least one first-type switch transistor has a conductivity type opposite to a conductivity type of the at least one second-type switch transistor.

5. The array substrate according to claim 4, wherein the at least one first control lead and the at least one second control lead, respectively connecting to the at least one first switch unit and the second switch unit that correspond to one touch control are a same control lead.

6. The array substrate according to claim 4, wherein the at least one first-type switch transistor is an N-type switch transistor and the at least one second-type switch transistor is a P-type switch transistor.

7. The array substrate according to claim 2, wherein
   the at least one first switch unit includes a plurality of first-type switch transistors; and
   the plurality of first-type switch transistors are configured in series with each other and electrically connected between the touch-control electrode and the touch-detection terminal.

8. The array substrate according to claim 2, wherein
   the second switch unit includes a plurality of second-type switch transistors; and
   the plurality of second-type switch transistors are configured in parallel with each other and electrically connected between the touch-control electrode and the reference signal terminal.

9. The array substrate according to claim 2, wherein the reference signal terminal includes a common signal terminal of the array substrate.

10. The array substrate according to claim 1, wherein:
a plurality of common electrodes is formed on the array substrate; and
the plurality of common electrodes includes the plurality of touch-control electrodes.

11. The array substrate according to claim 1, wherein the first switch units corresponding to touch-control electrodes in a same column are electrically connected to a same touch-detection terminal.

12. The array substrate according to claim 1, wherein the plurality of touch-detection terminals include input terminals for data signals of the array substrate.

13. The array substrate according to claim 1, wherein the touch-control electrode covers four pixel units.

14. A display panel containing an array substrate, wherein the array substrate comprises:
a plurality of pixel units, defined by intersected gate electrode lines and data lines;
a plurality of touch-control electrodes, arranged in an array; and
a touch-control circuit including a plurality of first switch units, a plurality of first control leads, a plurality of touch-detection terminals, a control unit, a plurality of second switch units, a plurality of second control leads, a reference signal terminal, and a plurality of reference leads, wherein:
a touch-control electrode of the plurality of touch-control electrodes is electrically connected to a touch-detection terminal of the plurality of touch-detection terminals through at least one first switch unit of the plurality of first switch units;
the at least one first switch unit is electrically connected to the control unit through at least one first control lead of the plurality of first control leads, and an OFF-state impedance of the at least one first switch unit is over 5000 kΩ;
the touch-control electrode is electrically connected to the reference signal terminal through a second switch unit of the plurality of second switch units;
the second switch unit is electrically connected to the control unit through at least one second control lead of the plurality of second control leads;
the second switch unit is electrically connected to the reference signal terminal through at least one reference lead of the plurality of reference leads;
the at least one first control lead is configured between two directly adjacent rows of the plurality of pixel units to preserve an aperture ratio of the plurality of pixel units and between two directly adjacent rows of the plurality of touch-control electrodes;
the at least one second control lead and the at least one reference lead are respectively configured between two directly adjacent rows of the plurality of pixel units and are at least partially overlapped with the touch-control electrode;
the at least one first control lead, the at least one second control lead and the at least one reference lead are arranged between different directly adjacent rows of the plurality of pixel units to avoid overly dense wiring between two directly adjacent rows of pixel units;
a row of the plurality of touch-control electrodes overlaps with a same second control lead and a same reference lead;
along a direction perpendicular to the array substrate, the touch-control electrode completely covers the second switch unit and the at least one first switch unit; and
when the array substrate is in a touch detection phase, the control unit is capable of controlling an ON status of the plurality of first switch units to allow row-by-row control of touch detection for the plurality of touch-control electrodes.

15. A display device containing the display panel according to claim 14.

16. The display panel according to claim 14, wherein the touch-control electrode covers four pixel units.

17. A method for forming an array substrate, comprising:
providing a plurality of pixel units, defined by intersected gate electrode lines and data lines;
forming a plurality of touch-control electrodes in an array; and
forming a touch-control circuit including a plurality of first switch units, a plurality of first control leads, a plurality of touch-detection terminals, a control unit, a plurality of second switch units, a plurality of second control leads, a reference signal terminal, and a plurality of reference leads, wherein:
a touch-control electrode of the plurality of touch-control electrodes is electrically connected to a touch-detection terminal of the plurality of touch-detection terminals through at least one first switch unit of the plurality of first switch units;
the at least one first switch unit is electrically connected to the control unit through at least one first control lead of the plurality of first control leads, and an OFF-state impedance of the at least one first switch unit is over 5000 kΩ;
the touch-control electrode is electrically connected to the reference signal terminal through a second switch unit of the plurality of second switch units;
the second switch unit is electrically connected to the control unit through at least one second control lead of the plurality of second control leads;
the second switch unit is electrically connected to the reference signal terminal through at least one reference lead of the plurality of reference leads;
the at least one first control lead is configured between two directly adjacent rows of the plurality of pixel units to preserve an aperture ratio of the plurality of pixel units and between two directly adjacent rows of the plurality of touch-control electrodes;
the at least one second control lead and the at least one reference lead are respectively configured between two directly adjacent rows of the plurality of pixel units and are at least partially overlapped with the touch-control electrode;
the at least one first control lead, the at least one second control lead and the at least one reference lead are arranged between different directly adjacent rows of the plurality of pixel units to avoid overly dense wiring between two directly adjacent rows of pixel units;
a row of the plurality of touch-control electrodes overlaps with a same second control lead and a same reference lead;
along a direction perpendicular to the array substrate, the touch-control electrode completely covers the second switch unit and the at least one first switch unit; and
when the array substrate is in a touch detection phase, the control unit is capable of controlling an ON status of the plurality of first switch units to allow row-by-row control of touch detection for the plurality of touch-control electrodes.

18. The method according to claim 17, wherein:
when the array substrate is in the touch detection phase, the control unit simultaneously controls the ON status of the plurality of first switch units and an OFF status of the plurality of second switch units to allow the row-by-row control of the touch detection for the plurality of touch-control electrodes; and
when the array substrate is in a display phase, the control unit simultaneously controls all of the plurality of first switch units in the OFF status and all of the plurality of second switch units in the ON status.

19. The method according to claim 17, wherein the first switch units corresponding to touch-control electrodes in a same column are electrically connected to a same touch-detection terminal.

20. The method according to claim 17, wherein the touch-control electrode covers four pixel units.

* * * * *